United States Patent [19]
Fujisawa

[11] Patent Number: 5,627,687
[45] Date of Patent: May 6, 1997

[54] OBJECTIVE LENS DRIVING APPARATUS AND METHOD FOR MANUFACTURE THEREOF

[75] Inventor: Hirotoshi Fujisawa, Tokyo, Japan

[73] Assignee: Sony Corporation, Tokyo, Japan

[21] Appl. No.: 490,065

[22] Filed: Jun. 13, 1995

[30] Foreign Application Priority Data

Jun. 17, 1994 [JP] Japan ................................... 6-135751
May 2, 1995 [JP] Japan ................................... 7-108859

[51] Int. Cl.⁶ .................................................. G02B 7/02
[52] U.S. Cl. ........................ 359/823; 359/813; 359/814
[58] Field of Search .............................. 359/813, 814, 359/823, 824; 369/44.15, 44.16

[56] References Cited

U.S. PATENT DOCUMENTS

| | | | |
|---|---|---|---|
| 4,669,823 | 6/1987 | Iguma et al. | 359/814 |
| 4,991,161 | 2/1991 | Ikegame et al. | 369/44.15 |
| 5,018,836 | 5/1991 | Noda et al. | 359/814 |
| 5,056,891 | 10/1991 | Masunaga | 359/813 |
| 5,208,703 | 5/1993 | Ikegame et al. | 359/813 |
| 5,220,459 | 6/1993 | Ichikawa et al. | 359/814 |

*Primary Examiner*—Loha Ben
*Attorney, Agent, or Firm*—Limbach & Limbach L.L.P.

[57] ABSTRACT

An objective lens driving device, and the method of its manufacture, comprising an objective lens, a stationary support, a holder carrying one or more driving coils and having mounted thereon an objective lens, a plurality of arm-shaped resilient supporting members, each having one end side mounted on the holder and having an opposite end side mounted to the stationary support so that the resilient supporting members are movable in a direction parallel to the optical axis of the objective lens, each of the resilient supporting members being arranged between the holder and the stationary support parallel to each other along a direction perpendicular to the optical axis of the objective lens and being formed of electrically conductive material, with at least two of the resilient supporting members being directly connected to melted end portions of the one or more driving coils. The one or more driving coils are formed of an electrically conductive wire having an electrically insulating coating film on its surface, each end of the one or more driving coils having a terminal portion having a planar surface with the electrically conductive wire being exposed to outside. The terminal portion is directly connected either by welding or ultrasonic fusion to a portion of one of the resilient supporting members mounted on the holder which is exposed from the holder.

8 Claims, 8 Drawing Sheets

OBJECTIVE LENS DRIVING APPARATUS AND METHOD FOR MANUFACTURE THEREOF

BACKGROUND OF THE INVENTION

1. Field of the Invention

This invention relates to an objective lens driving device for driving and displacing an objective lens, converging and radiating an outgoing light beam from a light source, such as a semiconductor laser, to an optical recording medium, such as an optical disc or a magneto-optical disc, in a direction of an optical axis of the objective lens or in a planar direction perpendicular to the optical axis, by an electro-magnetic driving means, and a method for manufacture thereof. More particularly, it relates to an objective lens driving device in which a supporting member supporting the objective lens is used as a feeder line to a driving coil, and a method for manufacture thereof.

2. Description of the Related Art

A recording and/or reproducing apparatus, employing an optical recording medium, such as an optical disc or a magneto-optical disc, as a recording medium for recording information signals, includes an optical pickup unit for radiating a light beam onto a signal recording surface of an optical recording medium or detecting the return light reflected from the signal recording surface for recording or reading out information signals on or from the recording medium.

The optical pickup has a light source, such as a semiconductor laser, for radiating a light beam onto the signal recording surface of the optical recording medium, an objective lens for radiating and converging the light beam outgoing from the light source on the signal recording surface of the optical recording medium.

In addition, the optical pickup has an objective lens driving device for driving and displacing the objective lens, radiating and converging the light beam from the light source on the signal recording area of the optical recording medium, in a focusing direction along the optical axis of the lens and in a tracking direction along a plane perpendicular to the optical axis, for converging the light beam on the signal recording area and correctly tracing a recording track formed on the recording medium.

This sort of the objective lens driving device, shown in FIG. 1, includes four flexible linear supporting members 3, such as wires, supporting a lens holder 2 holding an objective lens 1 for supporting the objective lens 1 for movement in the focusing direction along the optical axis of the objective lens 1 as indicated by arrow F in FIG. 1 and in the tracking direction along the plane perpendicular to the optical axis as indicated by arrow T in FIG. 1. The objective lens driving device shown in FIG. 1 is so designed and constructed that the lens holder 2 is supported on the distal ends of the four supporting members 3 having their proximal ends supported in a cantilevered fashion on a stationary support substrate 5 set upright on a supporting base plate 4, formed of a magnetic metal plate and constituting a magnetic yoke. Thus the objective lens 1 held by the lens holder 2 is supported for movement in the focusing direction indicated by arrow F in FIG. 1 and in the tracking direction as indicated by arrow T in FIG. 1.

The objective lens driving device shown in FIG. 1 has an electro-magnetic driving unit for driving and displacing the lens holder 2 inclusive of the objective lens 1 in the focussing direction indicated by arrow F in FIG. 1 and in the tracking direction as indicated by arrow T in FIG. 1. The electro-magnetic driving unit is made up of a focusing driving coil 6 placed around the outer periphery of the lens holder 2, a pair of tracking driving coils 7 connected to the lateral side of the driving coil 6 and a magnetic circuit comprised of a pair of magnets 9, 9 mounted on a pair of upstanding pieces 8, 8 in turn mounted upright on the supporting base plate 4. The magnets 9, 9 are mounted on the upstanding pieces 8, 8 for facing the focusing driving coil 8 and the tracking driving coils 7.

On the supporting base plate 4 are mounted yoke pieces 8a, 8a facing the upstanding pieces 8, 8. These yoke pieces 8a, 8a are passed through through-holes 2a, 2a of the lens holder 2 for facing the magnets 9, 9.

The driving coil 6 for focussing and the driving coils 7 for tracking, making up the electro-magnetic driving unit, is fed with the control current corresponding to the focusing error signal and the tracking error signal produced on detecting the return light radiated via the objective lens 1 on the optical recording medium and reflected therefrom by a photodetector. If the control current is supplied to the driving coils 6 and 7 from a control circuit, a driving force is generated by the interaction of the magnetic flux of the magnets 9, 9 and the current flowing through the driving coils 6 and 7. Thus the lens holder 2 holding the objective lens 1 is displaced in the focusing direction indicated by arrow F and in the tracking indicated by arrow T in FIG. 1, at the same time as the four supporting members 3 are displaced flexibly.

For supplying the control currents corresponding to the focusing error signal and the tracking error signal to the driving coil 6 for focusing and the driving coils 7 for tracking, mounted on the lens holder 2, carrying the objective lens 1 and adapted for being displaced along with the objective lens 1, it is necessary to provide an electric connection between the driving coils and the control circuit as a supply source for the control currents.

Thus there is proposed such an objective lens driving device in which the supporting members 3 supporting the lens holder 2 are formed by electrically conductive linear metallic members and used as feeder lines for supplying the current to the driving coils 6 and 7. With this objective lens driving device, a printed wiring board 10 having an wiring pattern 10a formed thereon is mounted on an outer lateral surface of a stationary supporting substrate 5, and an electrical connection is established between the supporting members 3 and the control circuit, not shown, via the printed wiring board 10, as shown in FIG. 1. The driving coils 6, 7 have their coil ends 6a, 7a connected to distal ends 3a of the supporting members 3 protruded from supporting pieces 11 provided on the lateral side of the lens holder 2 for allowing the control currents to be supplied via the supporting members 3 to the respective driving coils 6 and 7.

Meanwhile, the connection between the driving coils 6, 7 and the supporting members 3 is established by placing the coil ends 6a, 7a around the distal ends 3a of the supporting members 3. If the electrical connection should be established in this manner by placing the coil ends 6a, 7a around the distal ends 3a of the supporting members 3, the assembling operation becomes complicated such that the objective lens driving device cannot be assembled efficiently. On the other hand, electrical connection cannot be established reliably by simply placing the coil ends 6a, 7a around the distal ends 3a of the supporting members 3.

For assuring reliable and efficient connection between the driving coils 6, 7 and the supporting members 3, it has been proposed to connect the coil ends 6a, 7a to the distal ends 3a of the supporting members 3 using a solder 12, as shown in FIG. 1.

However, it is difficult to apply the solder 12 of the same size and shape for each of the objective lens driving unit. If the solder 12 larger in specific gravity is deposited non-uniformly on the lens holder 2 which is displaced and operates as a movable part, the position of the center of gravity of the lens holder 2 cannot be maintained constant. Above all, if the center of gravity of the lens holder 2 is shifted in the small-sized objective lens driving unit, the objective lens 1, supported on the lens holder 2 supported in turn in a cantilevered fashion by flexibly movable supporting members, cannot be displaced correctly in mutually perpendicular biaxial directions, that is in the focusing and tracking directions. If the objective lens 1 cannot be displaced correctly in the focusing and tracking directions, the light beam radiated via the objective lens 1 on the optical recording medium cannot be converged on the signal recording area, while the light beam cannot correctly trace the recording track of the optical recording medium, as a result of which the information signals cannot be correctly recorded on or reproduced from the optical recording medium.

If, due to use of the solder 12, the position of the center of gravity of the lens holder 2 holding the objective lens 2 cannot be managed to be constant, the point of resonance of the objective lens 1 displaced by the control current supplied to the driving coils 6, 7 ceases to be constant. In such case, resonant vibration tends to be produced during driving the objective lens, with the result that it becomes impossible to produce an objective lens driving device allowing reliable displacement of the objective lens in an amount corresponding to the control current.

OBJECTS AND SUMMARY OF THE INVENTION

It is an object of the present invention to provide a novel objective lens driving device whereby the problem accrued from the use of a solder in the connection of the distal ends of the driving coils may be resolved, and a method for manufacture thereof.

It is another object of the present invention to provide a novel objective lens driving device allowing facilitated assembly and manufacture to a high tolerance and enabling reliable displacement of the objective lens in an amount corresponding to the control current, and a method for manufacture thereof.

It is a further object of the present invention to provide a novel objective lens driving device assuring facilitated management of the center of gravity of the lens holder holding the objective lens and high-precision assembly of the driving device, and a method for manufacture thereof.

In one aspect, the present invention provides an objective lens driving device having an objective lens, a holder carrying at least a driving coil and having mounted thereon an objective lens, and a plurality of resilient supporting members, having one ends mounted on the holder and having opposite ends mounted on stationary means so that the supporting members are movable in a direction parallel to the optical axis of the objective lens. Each of the resilient supporting members is formed of electrically conductive material, while at least two of the resilient supporting members are directly connected to ends of the driving coils without using solder. The ends of the driving coils and the supporting members are directly connected to each other by welding or fusion.

The terminal portions formed at end portions of the diving coils of the electrically conductive wires freed of the insulating coating films sheathed thereon are formed to have a planar surface.

The terminal portion formed at each end of each driving coil is directly connected to a portion of the supporting member mounted on the holder which is exposed from the holder.

With the objective lens driving device of the present invention, since the end of the driving coil mounted on the lens holder supported in a cantilevered fashion by linear resiliently flexible supporting members, which is freed of the insulating coating film, is directly connected to a portion of the supporting member by welding or fusion, the driving coils and the supporting members can be electrically connected to each other without employing a solder.

On the other hand, since the terminal portions at the end parts of the driving coils, freed of the insulating coating film thereon to present a flat surface, are directly connected to the supporting members, the contact area of the terminal portions with respect to the supporting members may be increased for increasing the connecting area and the bonding strength. In addition, since the terminal portions having the flat surfaces are connected to portions of the supporting members connected to the lens holder which are exposed from the lens holder, the connecting area between the terminal portions and the supporting members may be increased further for additionally increasing the bonding strength and maintaining stable connecting states.

The objective lens driving device according to the present invention is assembled by a first step of removing an insulating coating film from each end portion of at least one driving coil of an electrically conductive wire having the insulating coating film thereon, mounted on a lens holder holding an objective lens, for forming a terminal portion, and a second step of directly connecting the terminal portions of the driving coils to at least two of a plurality of electrically conductive supporting members carrying the lens holder at one ends and supported at the opposite ends by the stationary supporting member for supporting the lens holder in at least a direction parallel to the optical axis of the objective lens.

The first step is a step of heating and pressing end portions of the driving coils for removing the insulating coating films from the end portions of the driving coils for forming flat terminal portions.

The first step may also be a step of radiating a laser beam to end portions of said driving coils for removing the insulating coating films from the ends of the driving coils.

After the process of removing the insulating coating film by radiation of the insulating film, the coil ends of the driving coils are rolled to form terminal portions presenting planar surfaces.

With the method for producing the objective lens driving device according to the present invention, the ends of the driving coils mounted on a lens holder holding the objective lens are heated for removing the insulating coating films. The insulating coating film is removed at this time for forming an oxide film on the surface of the copper portion. The copper portion having the oxide film thereon is rolled for removing the copper oxide formed on the outer peripheral surface for forming the terminal portion at the end portion of the driving coil from which the copper oxide formed on the other peripheral surface of the coil is removed to expose the electrically conductive copper portion to outside. The terminal portion having its copper portion exposed to outside is rolled to present a planar surface. The terminal portion thus having the planar surface is directly connected by welding or fusion to the supporting member supporting the lens holder, thus assuring positive connection between the terminal portions and the supporting members and a reliable electrical connection between the driving coils and the coil supporting members.

In addition, since a laser beam is employed for removing the insulating coating film from the end of the driving coil by laser radiation the insulating coating film may be removed from desired portion.

DETAILED DESCRIPTION OF THE PREFERRED EMBODIMENTS

Figure 1:
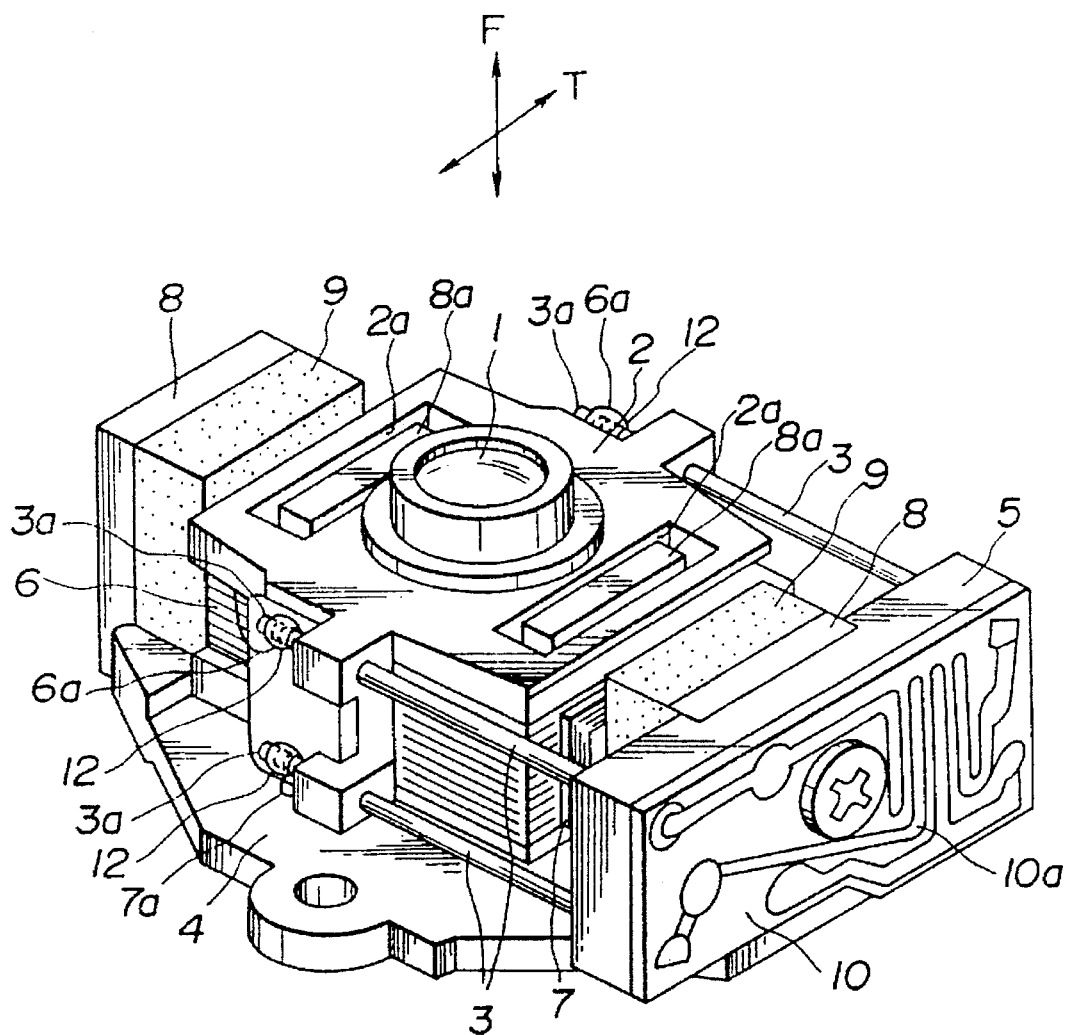
FIG. 1 is a perspective view showing a conventional objective lens driving device.

Referring to the drawings, preferred embodiments of the present invention will be explained in detail.

An objective lens driving device of the present embodiment is employed for an optical pickup constituting recording and/or reproducing means of a recording and/or reproducing apparatus employing an optical recording medium such as an optical disc or a magneto-optical disc as a recording medium for information signals.

Figure 2:
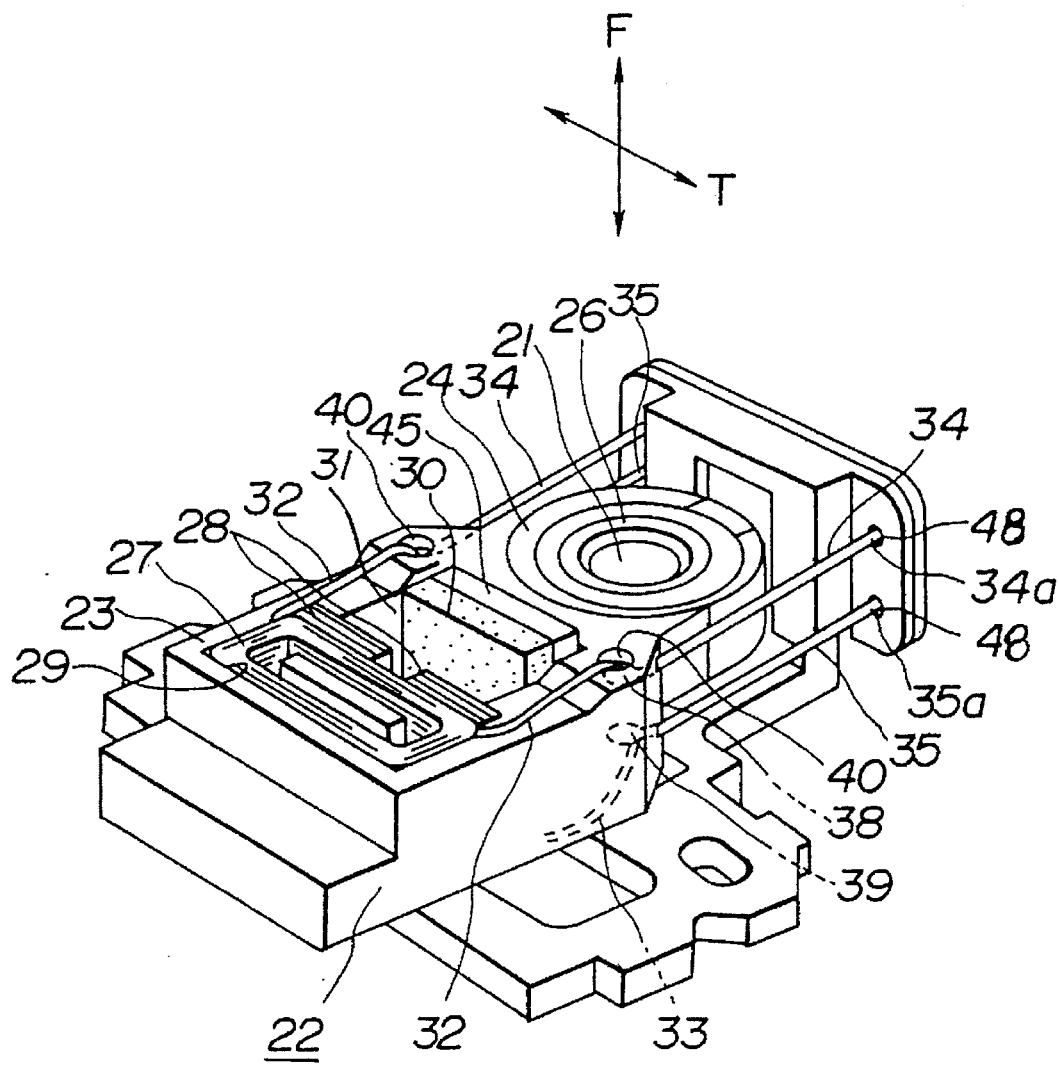
FIG. 2 is a perspective view showing an objective lens driving device according to the present invention.
Figure 3:
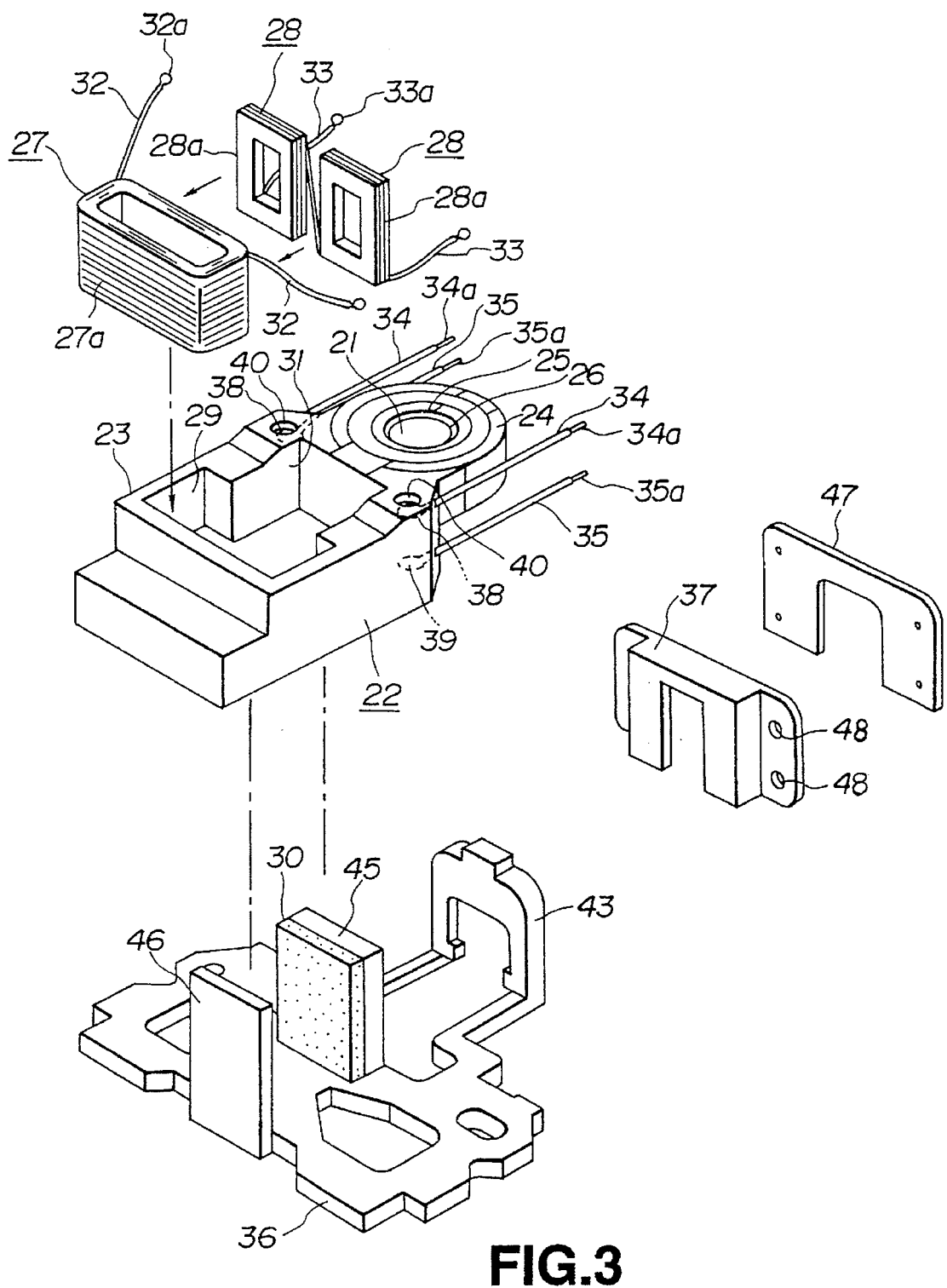
FIG. 3 an exploded perspective view of the objective lens driving device shown in FIG. 2.

The objective lens driving device has an objective lens 21 for converging a light beam outgoing from a light source, such as a semiconductor laser, and radiating it on a signal recording surface of the optical recording medium, and a lens holder 22 for holding the objective lens 21, as shown in FIG. 2. The lens holder 22 is molded from an insulating synthetic resin material and has a lens mounting portion 24 protruded on one end of a main holder body 23, as shown in FIG. 3. The lens mounting portion 24 has a lens fitting opening 25 in which the objective lens 21 is fitted via a lens bobbin 26. The main holder body 23 has an opening 29 for accommodating a focusing driving coil 27 and a pair of tracking driving coils 28, 28 and an opening 31 for a magnet 30 arrayed facing the driving coils 27, 28 for constituting an electro-magnetic driving unit. The driving coils 27, 28, 28 are fed with control currents from an objective lens driving circuit, not shown. The openings 29, 31 are in communication with each other.

The focusing driving coil 27, mounted in the coil-mounting opening 29, is formed by an electrically conductive thin copper wire sheathed with a rust-proofing insulating coating material, such as varnish, wound in the form of a square tube. The focusing driving coil 27, thus wound in the form of a tube, is arranged in the coil-mounting opening 29, and has its lateral surface bonded to a lateral surface of the opening 29 with an adhesive. The tracking driving coils 28, 28 are mounted within the opening 29 by being bonded to the sides of the focusing driving coil 27 opposite to the sides thereof bonded to the side of the opening 29. The tracking driving coils 28, 28 are formed by placing thin electrically conductive copper wires similar to that used for the focusing driving coil 27 in the form of planar rectangular units. The surface of each copper wire is sheathed with a coating material, such as varnish. The tracking driving coils 28, 28 are wound with the sole common sheathed wire being wound in the opposite winding direction. The driving coils 27, 28 have their end portions pulled out a pre-set length from main portions 27a, 28a as shown in FIG. 3 so as to serve as connecting portions to supporting members 34, 35 supporting the lens holder 22 which is now explained.

The lens holder 22, as a movable member holding the objective lens 21 and having mounted thereon the driving coils 27, 28, has its left and right sides each supported by a pair of supporting members 34, 35. These supporting members 34, 35 are formed of electrically conductive resiliently flexible metal wires or plate-shaped elongated members of narrow widths. Each of the supporting members 34, 35 has its proximal end secured to a supporting holder 37 and has its distal end connected to the lens holder 22 for flexibly supporting the lens holder 22. The supporting holder 37 is a stationary supporting member mounted on a supporting base plate 36 constituting a magnetic yoke carrying the magnet 30. The lens holder 22, having left and right sides of its proximal side supported by distal ends of resiliently flexible supporting members 34, 35, having their proximal ends supported by the supporting holder 37, is supported for resilient movement in the tracking direction and in the focusing direction as shown by the arrows T and F, respectively, in FIG. 2, with the supporting members 34, 35 as resilient flexible portions. The tracking direction shown by arrow T in FIG. 2 is a planar direction which is perpendicular to the direction of the optical axis of the objective lens 21 held by the lens holder 22, while the focusing direction shown by arrow F in FIG. 2 is a direction parallel to the optical axis of the object lens The connection of the lens holder 22 to the distal ends of the supporting members 34, 35 is by insert molding consisting in placing the supporting members 34, 35 in a metal mold configured for molding the lens holder 22 and by injecting the synthetic resin material into the inside of the metal mold for molding the lens holder 22.

Figure 5:
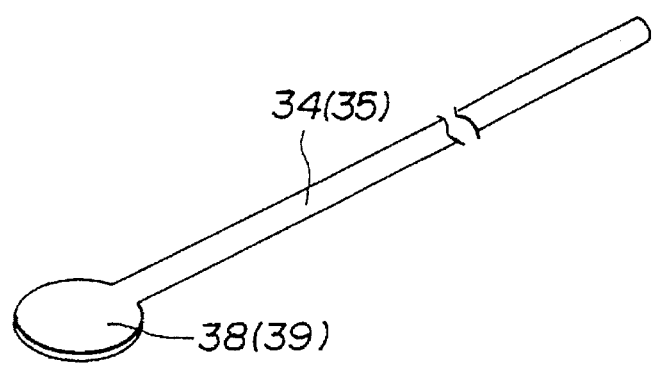
FIG. 5 is a perspective view showing a supporting member supporting a lens holder.

The foremost parts of the supporting members 34, 35 connected to the lens holder 22 are formed with electrode parts 38, 39 operating as connection portions configured for electrical and mechanical connection to the coil ends 32, 33 of the driving coils 27, 28. These electrode parts 38, 39 are formed as flat plates having planar surfaces by rolling the foremost parts of the linear supporting members 34, 35, as shown in FIG. 5.

Figure 6:
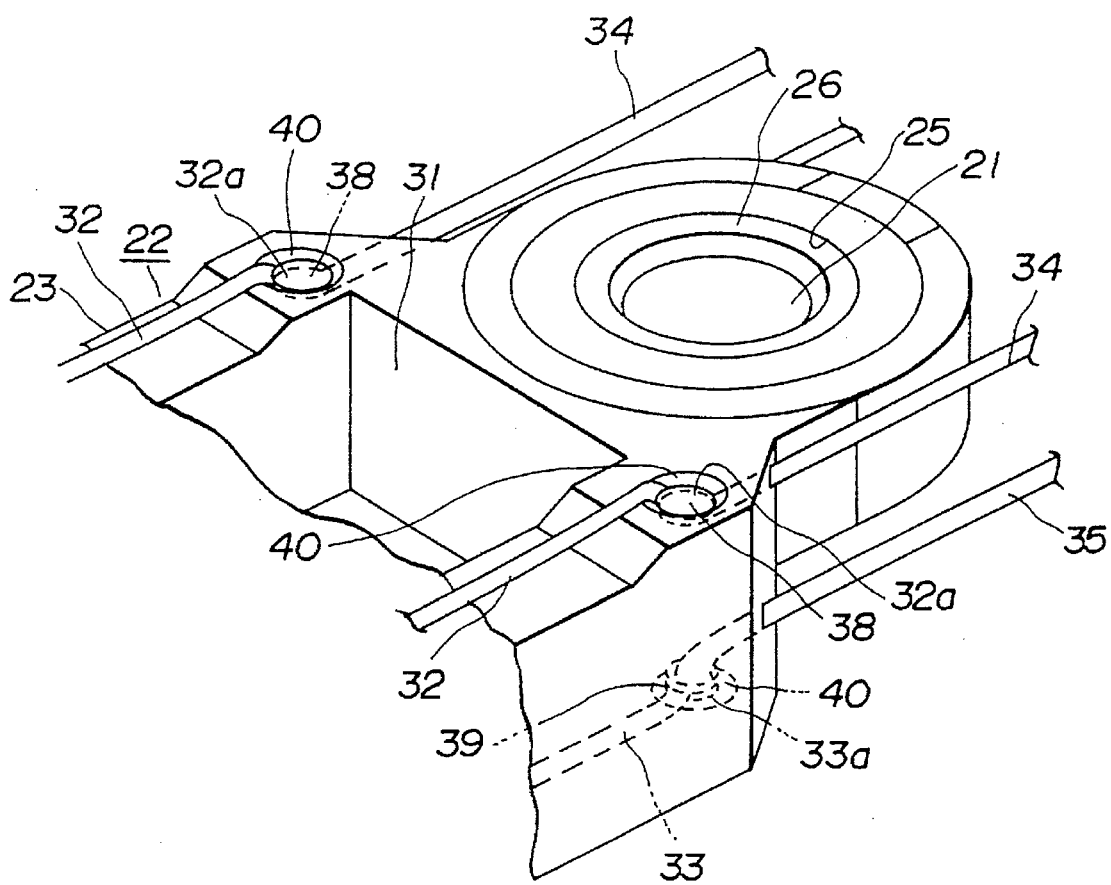
FIG. 6 is a perspective view showing the state of connection of a terminal portion of a driving coil to the supporting member.

The foremost parts of the supporting members 34, 35 are embedded in the lens holder 22 for assuring positive connection to the lens holder 22. Consequently, the electrode parts 38, 39 formed at the foremost parts of the supporting members 34, 35 are also embedded in the lens holder 22. To this end, the upper and lower surfaces of the lens holder 22 perpendicular to the optical axis of the objective lens 21 are formed with holes 40, as shown in FIG. 6. The electrode parts 38, 39 each have one surface laid open to the outside of the lens holder 22 via these holes 40.

The electrode parts 38, 39 formed at the distal ends of the supporting members 34, 35 may be laid open to outside on lateral sides of the lens holder 22 instead of on the upper and lower surfaces thereof.

Figure 7:
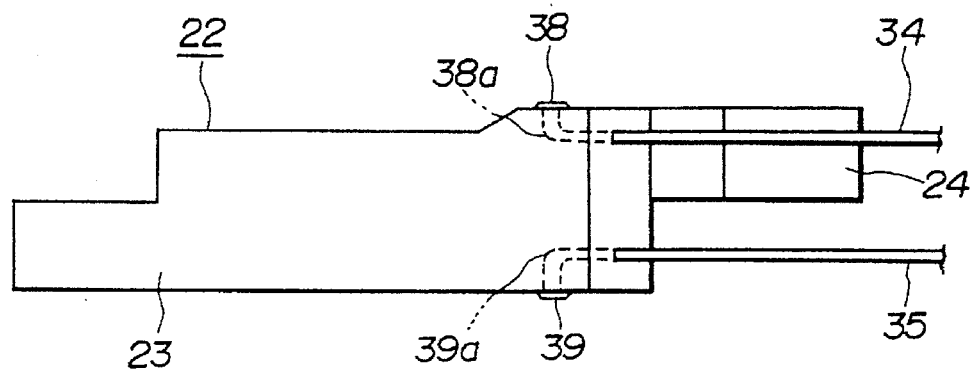
FIG. 7 is a side view showing the state of supporting the lens holder by the supporting member in a modification.

The proximal ends of the electrode parts 38, 39 may be formed with bends 38a, 39a, respectively, so that the electrode parts 38, 39 are each laid open on one surface thereof on the upper and lower surfaces of the lens holder 22 when the supporting members 34, 35 have their foremost ends embedded in and connected to the lens holder 22, as shown in FIG. 7.

Figure 8:
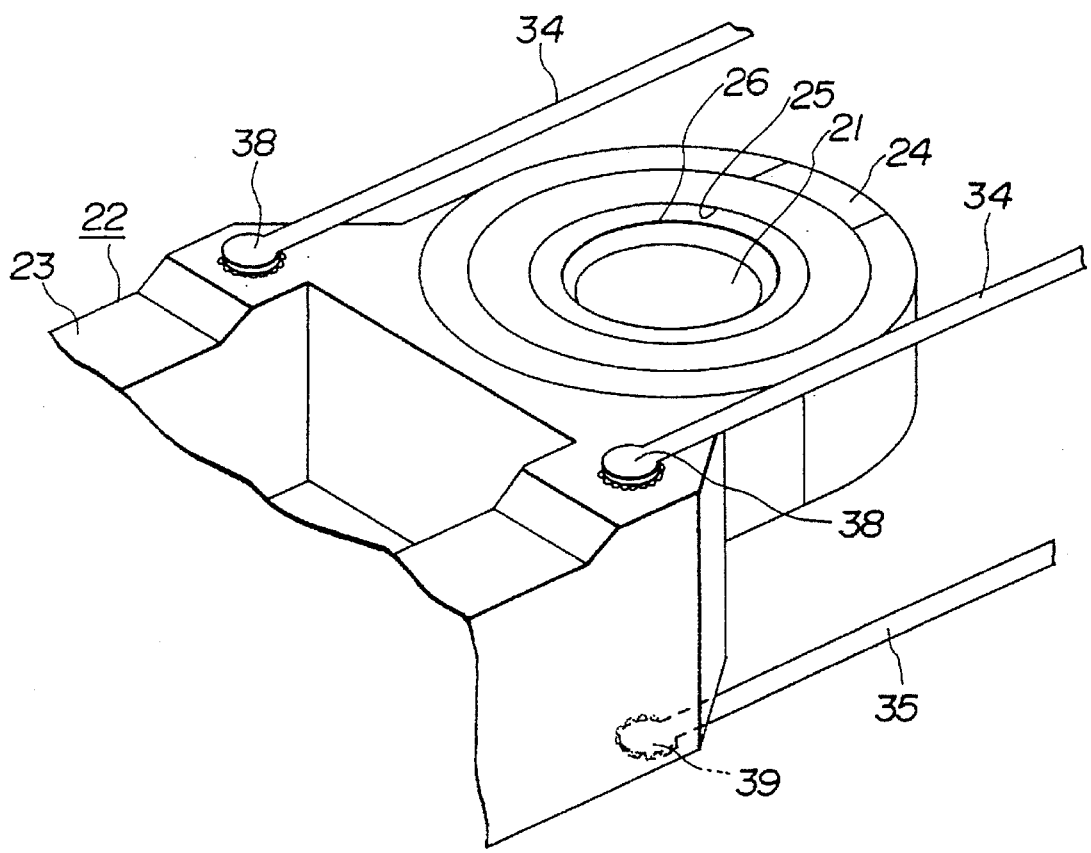
FIG. 8 is a perspective view showing the state of supporting the lens holder by the supporting member in a further modification.

Instead of insert molding the supporting members 34, 35 in the lens holder 22, the supporting members 34, 35 may be connected to the lens holder 22 by fusing the electrode parts 38, 39 to the upper and lower surfaces of the lens holder 22 so that the electrode parts 38, 39 each have one surface laid open to the upper and lower surfaces of the lens holder 22, as shown in FIG. 8. Such connection of the electrode parts 38, 89 to the lens holder 22 by fusion may be achieved by partially fusing synthetic resin material of the lens holder 22 and by having the rim parts of the electrode parts 38, 39 and the supporting members 34, 35 supported by the thus fused portions of the synthetic resin material.

Figure 4:
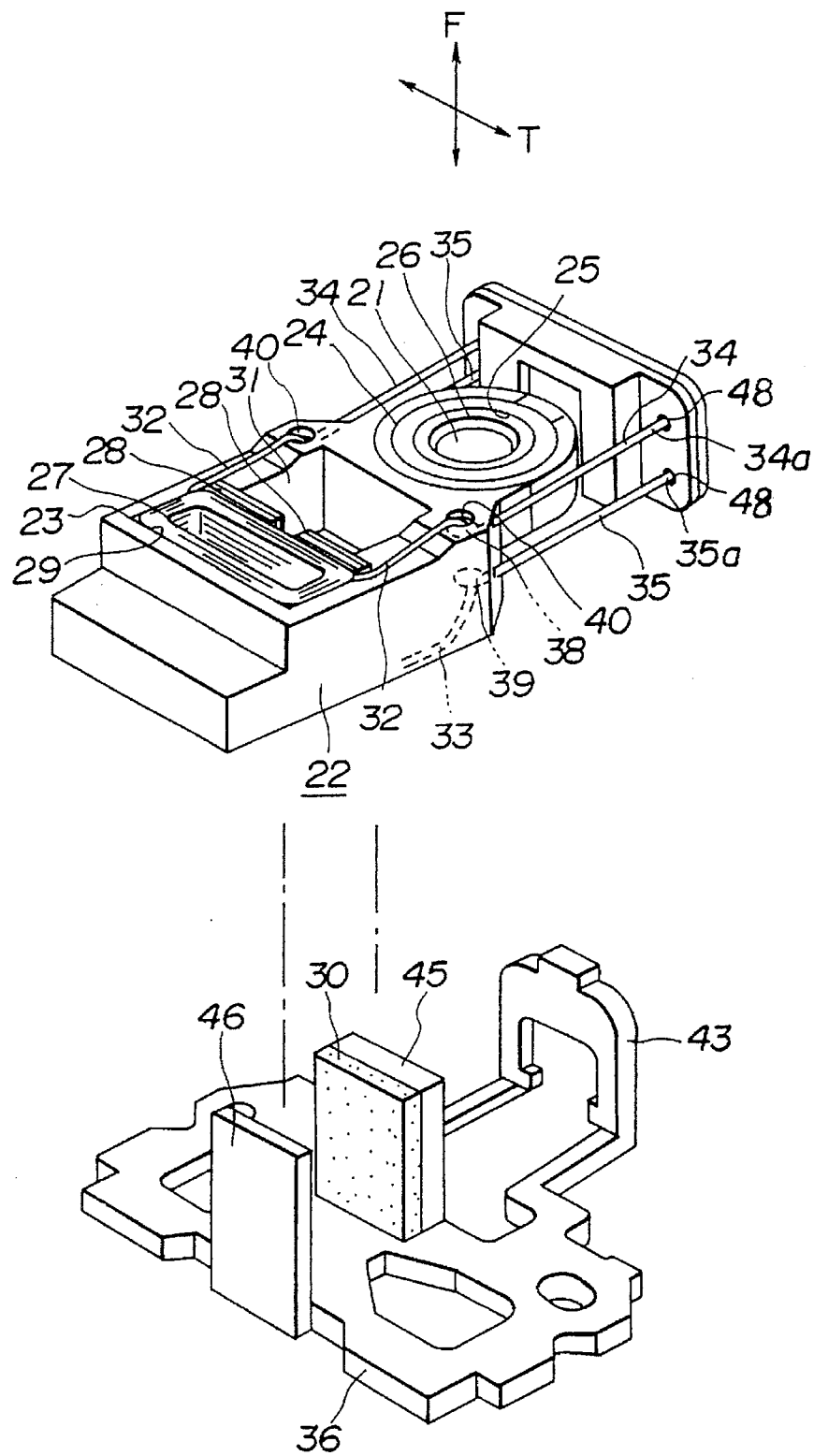
FIG. 4 is a perspective view showing a lens holder being assembled to the magnetic circuit side.

The supporting members 34, 35, supporting the lens holder 22 at the distal ends thereof as described above, have proximal ends 34a, 35a thereof passed through through-holes 48 bored in the supporting holder 37 of an electrically insulating synthetic resin material. The supporting holder 37 is mounted on an upstanding holder mounting portion 43 on the proximal end of the supporting base plate 36. An adhesive exhibiting elasticity in a cured state is then charged into the through-holes 48 for securing the supporting members 34, 35 to the supporting holder 37, as shown in FIG. 4.

The supporting members 34, 35, having their distal ends embedded in and connected to the lens holder 22 formed of an insulating material and having their proximal ends 34a, 35a formed of an insulating material, are electrically insulated and thus electrically isolated from each other.

The proximal ends 34a, 35a of the supporting members 34, 35 are connected to a connection pattern formed in a printed wiring board 47 electrically connected to an objective lens driving control circuit, not shown, provided on the back side of the supporting holder 37. The supporting members 34, 35 are fed with the control current from an objective lens driving control circuit via the printed wiring board 47 from the objective lens driving control circuit.

When the supporting holder 37 supporting the supporting members 34, 35, supporting in turn the lens holder 22 as described above, is mounted on the holder mounting portion 43, the magnet 30 arranged on the supporting base plate 36 is introduced into the opening 31 for the magnet 30 formed in the lens holder 22 for facing the focusing driving coil 27 and the tracking driving coils 28, 28. The magnet 30 is mounted on the inner surface of one of a pair of upstanding portions 45, 46 of the supporting base plate 36. The magnet 30 is introduced into the opening 31 along with the upstanding portion 45 on which it is secured as described above. The opposite side upstanding portion 46, facing the magnet 30, is introduced into the inside of the tubular focusing driving coil 27 mounted on the lens holder 22 for facing the magnet 30, as shown in FIG. 2.

The focusing driving coil 27 and the tracking driving coils 28, 28, mounted on the lens holder 22, are connected to the objective lens driving control circuit by connecting terminal portions 32a, 32b to the electrode parts formed at the distal ends of the electrically conductive supporting members 34, 35. The terminal portions 32a, 32b are formed by exposing electrically conductive copper wire portions at coil ends 32, 33, respectively. The focusing driving coil 27 and the tracking driving coils 28, 28 are respectively fed with the control currents corresponding to the focusing error signals and tracking error signals from the objective lens driving control circuit. When the driving coils 27, 28 are fed with the control current, a driving force is generated under the action of the currents flowing in the driving coils 27, 28 and the magnetic flux from the magnet 30. Thus the lens holder 22 carrying the objective lens 21 is displaced in the focusing direction indicated by arrow F and in the tracking direction indicated by arrow T in FIG. 2, at the same time as the four supporting members 34, 35 are flexed resiliently.

Meanwhile, since the focusing driving coil 27 and the tracking driving coils 28, 28 are formed by sheathing the surface of the electrically conductive copper wires with an insulating material, electrical connection cannot be completed if the coil ends 32, 33 of the driving coils 27, 28 are simply connected to the electrode parts 38, 39. Thus it is necessary to remove an insulating coating film 52 of an electrically insulating material, such as a varnish, sheathing the coil ends 32, 33 of the driving coils 27, 28, in order to expose the electrically conductive copper wire portions 53 to outside.

Figure 9:
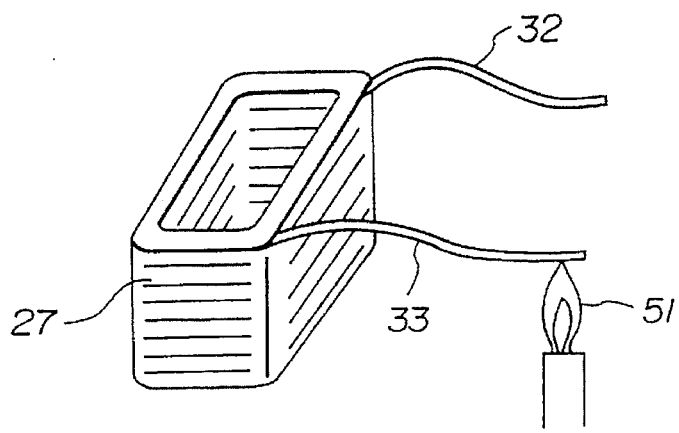
FIG. 9 is a perspective view showing the state of removal of an insulating coating of a coil terminal of a driving coil.

In the present embodiment, for exposing the copper wire portions 53 in at least the coil ends 32, 33 of the driving coils 27, 28, operating as connection portions to the electrode parts 38, 39, the coil ends 32, 33 are heated to a temperature not lower than the fusing point of copper, using a flame 51 in an oxygen-containing atmosphere, as shown in FIG. 9.

Figure 10:
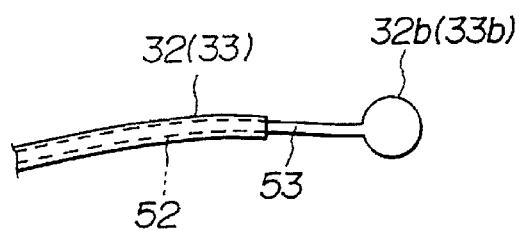
FIG. 10 is a perspective view showing the state in which a spherical portion has been formed at the coil end.

When the coil ends 32, 33 are heated to the temperature not lower than the fusing point of copper, the insulating material, such as varnish, sheathing the heated portion, is burned or vaporized off, while the copper wire portions 53 constituting the coil ends 32, 33 are partially fused. The fused portions of the copper wire portions 53 form spherical portions 32b, 33b at the end portions of the coil ends 32, 33, under the surface tension of the fused copper, as shown in FIG. 10. These spherical portions 32b, 33b are copper wire portions covered with copper, that is copper oxide, produced by oxidation.

The size and shape of the copper spherical portions 32b, 33b, formed at the end portions of the coil ends 32, 33, can be controlled by controlling the heating temperature of heating the coil ends 32, 33 and/or the amount of oxygen at the time of heating with the flame 51.

Figure 11:
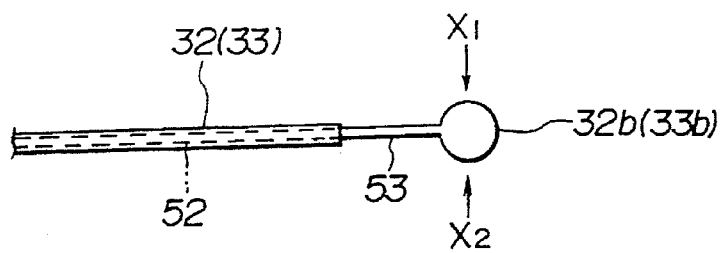
FIG. 11 is a perspective view showing the state in which the spherical portion formed at the coil end is rolled in order to form a terminal portion.
Figure 12:
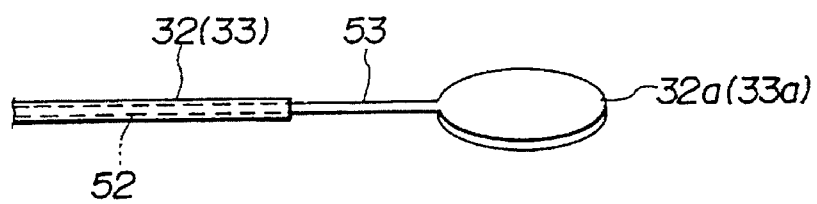
FIG. 12 is a perspective view showing the state in which the spherical portion formed at the coil end is rolled and the terminal portion has thereby been formed.

The copper spherical portions 32b, 33b, coated with an oxide film, formed at the terminal portions of the coil ends 32, 33 as a result of heating, are rolled using a rolling unit. The rolling is performed by thrusting the opposite sides of the spherical portions 32b, 33b from the direction indicated by arrows $X_1$, $X_2$ of FIG. 11. On rolling the spherical members 32b, 33b, the fragile oxide film is cracked and removed to form substantially disc-shaped terminals portions 32a, 33a having planar surfaces, as shown in FIG. 12. The oxide film, operating as an insulating material, is removed on rolling to expose the inner copper portion to form a flat disc surface. Thus the electrical conductivity may be improved while the connection surface to the electrode parts 38, 39 formed at the distal ends of the supporting members 34, 35 may be increased.

The terminal portions 32a, 33a formed at the coil ends 32, 33 are put on the electrode parts 38, 39 at the foremost parts of the supporting members 34, 35 facing the outer rim of the lens holder 22, so as to be directly connected thereto by welding or fusion for establishing electrical connection, as shown in FIG. 6. Spot welding is used for welding the terminal portions 32a, 33a to the electrode parts 38, 39. Ultrasonic welding is employed as a welding technique.

When connecting the terminal portions 32a, 33a to the electrode parts 38, 39 by welding or fusion, the terminal portions 32, 33 drawn out of the driving coils 27, 28 are preferably supported by the lens holder 22, using an adhesive for provisional bonding and a positioning jig for correctly positioning the connecting position and assuring positive electrical conduction.

With the objective lens driving device of the present embodiment, since the terminal portions 32a, 33a formed by exposing the electrically conductive copper portions are welded or fused to the electrode parts 38, 39, the driving coils 27, 28 may be electrically connected to the driving coils 27, 28 for feeding the driving coils 27, 28 with current reliably via the electrically conductive supporting members 34, 35. On the other hand, since the terminals portions 32a, 33a are formed as flat discs presenting planar surfaces by rolling, a sufficient contact area may be assured of the terminal portions 32a, 33a which can be easily connected to the electrode parts 38, 39 of the supporting members 34, 35 using spot welding or ultrasonic welding, even although an extremely thin wire is used for the sheathed wire of the driving coils 27, 28.

Since the driving coils 27, 28 and the supporting members 34, 35 may be directly connected to each other by welding or fusion without using an adhesive difficult to control as to the amount of application, such as solder, the weight balance of the lens holder 22 carrying the objective lens 21 and operating as a movable part may be controlled pursuant to the design statements. In addition, since the terminal portions 32a, 33a are formed by rolling to a planar disc-shaped surface, they can be easily registered with respect to the electrode parts 38, 39 and hence can be bonded in position to the electrode parts 38, 39. Thus the position of the center of gravity of the lens holder 22 flexibly supported by the supporting members 34, 35 can be rendered constant from one objective lens driving device to another so that such objective lens driving device may be produced in which the objective lens 21 can be stably and correctly displaced in the focusing and tracking directions responsive to the control currents supplied to the driving coils 27 and 28. In addition, since the position of the center of gravity of the lens holder 22 may be maintained easily at a constant position, the objective lens 21 may be displaced in the focusing and tracking directions with high responsiveness to the control currents supplied to the driving coils 27 and 28 without producing wasteful resonant vibrations during driving.

The terminal portions 32a, 33a are formed by the process prior to the mounting of the driving coils 27, 28 to the lens holder 22, while the bonding of the terminal portions 32a, 33a to the electrode parts 38, 39 is achieved in a process prior to the supporting of the lens holder 22 by the supporting holder 37 via the supporting members 34, 35. The terminal portion 33a is provided on the tracking driving coil 28 before mounting the driving coil 28 on the focusing driving coil 27. That is, the terminal portions 32a, 33a of the focusing driving coil 27 and the tracking driving coil 28 are formed by respective separate process steps.

The portions of the supporting members 34, 35 of electrically conductive materials supporting the lens holder 22, other than the electrode parts 38, 39 and the connecting portions to the printed circuit board 46, are preferably coated with an insulating coating. By coating the supporting members 34, 35 with an insulating coating film, it is possible to prevent an accident, such as shorting, which is produced by contact of the foreign matter with the supporting members 34, 35. Although the terminal portions 32a, 33a are formed in the above-described embodiment by heating the terminal portions of the coil ends 32, 33 followed by rolling, the heating and rolling may also be carried out simultaneously. That is, the flat disc-shaped terminals portions 32a, 33a may also be formed by using a rolling device rolling the end portions of the coil ends 32, 33 with a heating unit and rolling these end portions under simultaneous heating at a temperature which is not sufficient to produce an oxide film on the surface of the terminal portions and sufficient to melt off the insulating film 52 covering the coil ends 32, 33. By such simultaneous heating and rolling, the terminal portions 32a, 33a can be rendered more uniform in size so that the process from removal of the insulating coating film up to the formation of the terminal portions 32a, 33a exposing the copper portions to outside may be performed more easily.

Although the insulating film 52 is removed for forming the terminal portions 32a, 33a in the above embodiment by heating the coil ends 32, 33 of the driving coils 27, 28 using a heat source such as the flame 51, it is also possible to use a laser beam for removing the insulating film 52.

Figure 13:
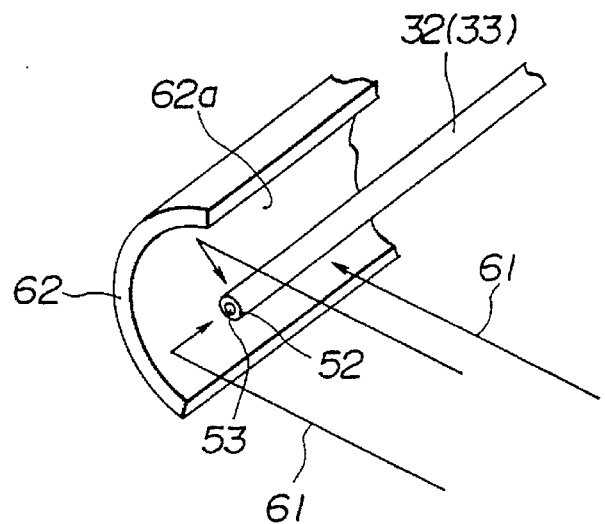
FIG. 13 is a perspective view showing the state in which the insulating coating at the driving coil end is being removed using a laser beam.

For removing the insulating coating film 52 using the laser beam, the coil ends 32, 33 of the driving coils 27, 28 are extended towards a curved reflective surface 62a of a reflective plate 62 configured to reflect a laser beam 61 radiated from a laser light source, as shown in FIG. 13. By radiating the laser beam 61 from the laser light source, not shown, onto the coil ends 32, 33, the insulating coating film 52 is melted off for exposing the electrically conductive copper wire portion 53 for forming the terminal portions 32a, 33a.

By having the coil ends 32, 33 extended towards the reflective surface 62a of the reflective plate 62 at the time of laser beam radiation, the laser beam 61 is reflected by the reflective surface 62a so as to be radiated on the entire periphery of the coil ends 32, 3S for enabling removal of the insulating coating film 52 easily over the entire periphery of the coil ends 32, 33 without varying the radiating direction of the laser beam 61.

As the laser beam source, an excimer laser capable of radiating a short wavelength laser beam can be employed. Above all, a KrF excimer laser is most preferred.

Figure 14:
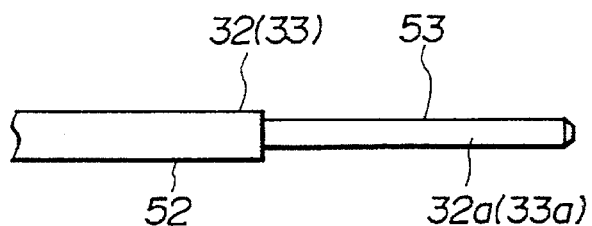
FIG. 14 is a perspective view showing the state in which the insulating coating at the driving coil end has been removed using a laser beam and the terminal portion has thereby been formed.

By employing the laser beam 61, the insulating coating film 52 may be removed over a desired extent, as shown in FIG. 14, so that the copper wire portion 53 of a length sufficient to be directly connected by welding or fusion to the electrode parts 38, 39 may be exposed to outside to form the terminal portions 32a, 33a.

By using the laser beam 61, there is no risk of an oxide film being formed on the surface of the copper wire 53 exposed to outside on removal of the insulating film 52. Thus the copper wire portion 53 may be used as the terminal portions 32a, 83a for direct connection to the electrode parts 38, 39 by welding or fusion.

Figure 15:
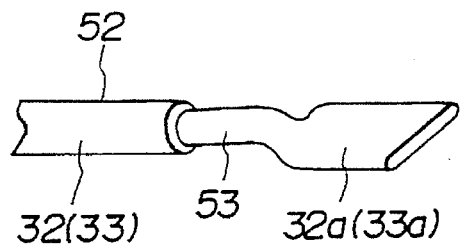
FIG. 15 is a perspective view showing the state in which the coil end freed of the insulating coating is rolled and the terminal portion has thereby been formed.

The terminal portions 32a, 33a of the coil ends 31, 32, of the driving coils 31, 32 freed of the insulating coating film 52 are preferably rolled by a rolling device shown in FIG. 15 to a planar disc shape so as to be easily welded or fused to the electrode parts 38, 39 with correct registration. Such rolling of the terminal portions 32a, 33a is carried out after removal of the insulating coating film 52 with the aid of the laser beam.

The above description has been made of an objective lens driving device in which the focusing driving coil 27 and the tracking driving coils 28 are provided for displacing the objective lens 21 held by the lens holder 22 in the focusing direction indicated by arrow F in FIG. 2 parallel to the optical axis of the objective lens 211 and in the tracking direction which is a planar direction perpendicular to the optical axis of the objective lens 21 as indicated by arrow F in FIG. 2. The present invention is also applicable to such an objective lens driving device in which one of the focusing driving coil 27 and the tracking driving coils 28 is provided for displacing the objective lens 21 in one of the focusing and tracking directions.

What is claimed is:

1. An objective lens driving device comprising
an objective lens,
a stationary member,
a holder carrying one or more driving coils and having mounted thereon an objective lens,
a plurality of arm-shaped resilient supporting members, each having one end side mounted on said holder and having an opposite end side mounted to said stationary member so that the resilient supporting members are movable in a direction parallel to the optical axis of the objective lens, each of the resilient supporting members being arranged between said holder and said stationary member parallel to each other along a direction perpendicular to the optical axis of said objective lens and being formed of electrically conductive material, at least two of said resilient supporting members being directly connected to different melted end portions of said one or more driving coils.

2. The objective lens driving device as claimed in claim 1, wherein said one or more driving coils is formed of an electrically conductive wire having an electrically insulating coating film on its surface, each end of the one or more driving coils having a terminal portion having a planar surface with the electrically conductive wire being exposed to outside.

3. The objective lens driving device as claimed in claim 2, wherein said terminal portion is directly connected to a portion of one of the resilient supporting members mounted on the holder which is exposed from said holder.

4. The objective lens driving device as claimed in claim 1, wherein each end of each of said one or more driving coils is formed with a terminal portion for direct coupling to a portion of a different one of the resilient supporting members mounted on the holder which is exposed from said holder.

5. A method for producing an objective lens driving device having a holder and a plurality of electrically conductive resilient supporting members, said holder having one or more driving coils and carrying an objective lens, said one or more driving coils each being formed by an electrically conductive wire having an insulating coating film on its surface, said resilient supporting members being displaced at least in a direction parallel to the optical axis of said objective lens and said resilient supporting members each having one end configured to be movable in a direction along the optical axis of said objective lens and having another end secured to a stationary member, said method comprising a first step of removing the insulating coating film from end portions of the one or more driving coils to form terminal portions by heating and pressing end portions of the one or more driving coils for removing the insulating coating films from the end portions of the one or more driving coils and forming flat terminal portions, and a second step of directly connecting the terminal portions thus formed to said resilient supporting members either by welding or ultrasonic fusion.

6. The method as claimed in claim 5, wherein said first step is a step of radiating a laser beam to said end portions of said one or more driving coils for removing the insulating coating films from the ends of said one or more driving coils.

7. A method for producing an objective lens driving device having a holder and a plurality of electrically conductive resilient supporting members, said holder having one or more driving coils and carrying an objective lens, said one or more driving coils each being formed by an electrically conductive wire having an insulating coating film on its surface, said resilient supporting members being displaced at least in a direction parallel to the optical axis of said objective lens, said resilient supporting members each having one end configured to be movable in a direction along the optical axis of said objective lens and having another end secured to a stationary member, at least two of the resilient supporting members having portions mounted on said holder being exposed from said holder to form exposed portions, said method comprising a first step of removing the insulating coating film from end portions of the one or more driving coils to form the terminal portions by heating and pressing end portions of the one or more driving coils for removing the insulating coating films from the end portions of the one or more driving coils for forming flat terminal portions, and a second step of directly connecting the terminal portions thus formed to said exposed portions of said supporting members either by spot welding or ultrasonic fusion.

8. The method as claimed in claim 7, wherein said first step is a step of radiating a laser beam to said end portions of said one or more driving coils for removing the insulating coating films from the ends of said one or more driving coils.

* * * * *